United States Patent [19]

Talbot

[11] Patent Number: 4,620,604
[45] Date of Patent: Nov. 4, 1986

[54] SNOWMOBILE FRAME STRUCTURE
[75] Inventor: Jean-Guy Talbot, Valcourt, Canada
[73] Assignee: Bombardier Inc., Montreal, Canada
[21] Appl. No.: 706,186
[22] Filed: Feb. 27, 1985
[51] Int. Cl.$^4$ ............................................ B62M 27/00
[52] U.S. Cl. ...................................... 180/190; 180/312
[58] Field of Search ........................ 180/190, 312, 291; 280/781

[56] References Cited

U.S. PATENT DOCUMENTS

| 3,840,083 | 10/1974 | Woods | 180/312 |
| 3,877,535 | 4/1975 | Gorski | 180/190 |
| 3,882,948 | 5/1975 | Southiere | 180/190 |
| 3,985,192 | 10/1976 | Samuelson | 180/190 |

Primary Examiner—John A. Pekar
Attorney, Agent, or Firm—Larson and Taylor

[57] ABSTRACT

This invention relates to a new or improved snowmobile frame structure which comprises a pair of loop shaped tubular frame members extending forwardly of the track tunnel which are braced by transverse frame members welded thereto and provides support for the snowmobile engine suspension and steering components.

4 Claims, 3 Drawing Figures

SNOWMOBILE FRAME STRUCTURE

FIELD OF INVENTION

This invention relates to snowmobiles, in particular to a new or improved snowmobile frame structure.

DESCRIPTION OF THE PRIOR ART

Conventionally, the frame structure of a snowmobile has included a pair of relatively deep channel or I-section metal beams extending forwardly from opposite sides of the front of the track tunnel to form the mounting for the snowmobile engine, ski suspension, steering mechanism etc. Normally these metal beams have been welded at their lower sides to the belly pan of the front portion of the snowmobile to form an integral structure therewith. This required that the belly pan should be of steel plate, and being a rather large component, the weight of such a frame structure was relatively high. Furthermore, the metal beams provided very restricted access to the sides of the engine which was mounted therebetween.

SUMMARY OF THE INVENTION

The present invention provides an improved snowmobile frame structure which avoids the disadvantages of the frame structures previously employed.

More particularly, the invention provides a snowmobile comprising: a front portion supported on a pair of spaced steerable skis and housing an engine coupled to drive an endless track which supports the rear portion of the snowmobile and is positioned within a longitudinally extending track tunnel of inverted U-shape, wherein two transversely spaced tubular side frame units are attached to the front end of the track tunnel and extend forwardly therefrom in a generally upright disposition, said side frame units each having the form of a loop and being interconnected by transverse bracing means to form a frame structure that provides a mounting for the snowmobile engine.

This frame structure preferably also provides a mounting for the ski suspension and for the steering arrangement for the skis. Accordingly, since the belly pan of the snowmobile is not required to fulfill any structural function, it can be made of relatively thin and lightweight material. This then provides a significant weight saving, as well as added flexibility in the design and layout of steering and suspension components. The side frame units being in the form of loops, provide ready access to the snowmobile engine which is mounted between them.

In a preferred embodiment, the frame structure is a welded steel fabrication. The side frame units have rear portions that are welded to the sides of the front of the track tunnel, and the bracing means is provided by tubular elements that span the front ends of the side frame units and are welded thereto. Also welded on the frame structure are brackets that provide for the attachment of the ski suspension means and steering means.

DESCRIPTION OF THE DRAWINGS

The invention will further be described, by way of example only, with reference to the accompanying drawings wherein.

DESCRIPTION OF THE PREFERRED EMBODIMENT

Figure 1:
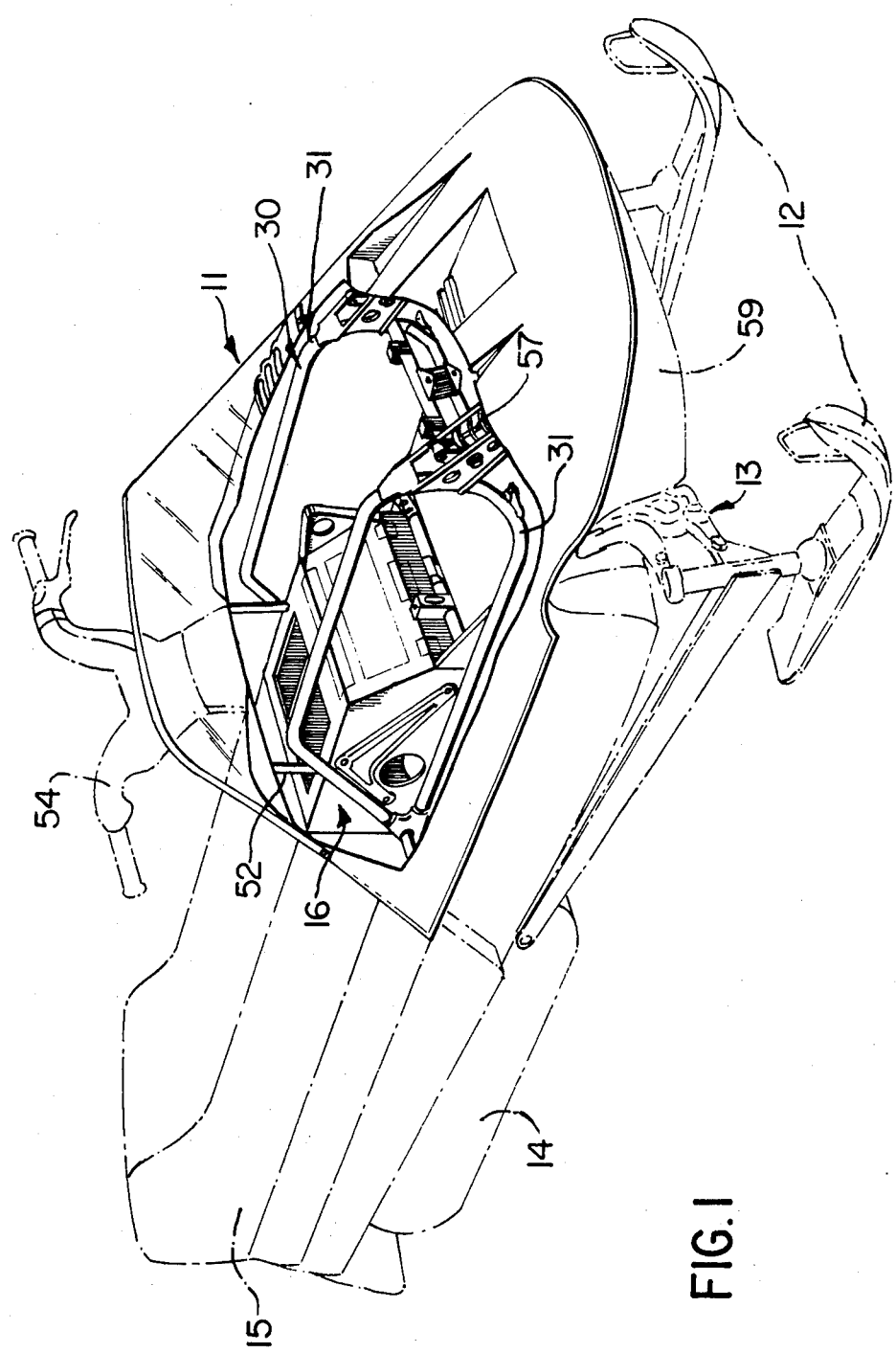
FIG. 1 is a somewhat schematic perspective view of a snowmobile in accordance with the invention.

Referring to FIG. 1, a snowmobile 11 is supported at its front end on a pair of steerable skis 12 through suitable suspension means 13 and at its rear end on a driven track 14. The track 14 in known manner is housed within a track tunnel 15 of inverted U-shape configuration and connected thereto by a suitable suspension means (not shown).

Figure 2:
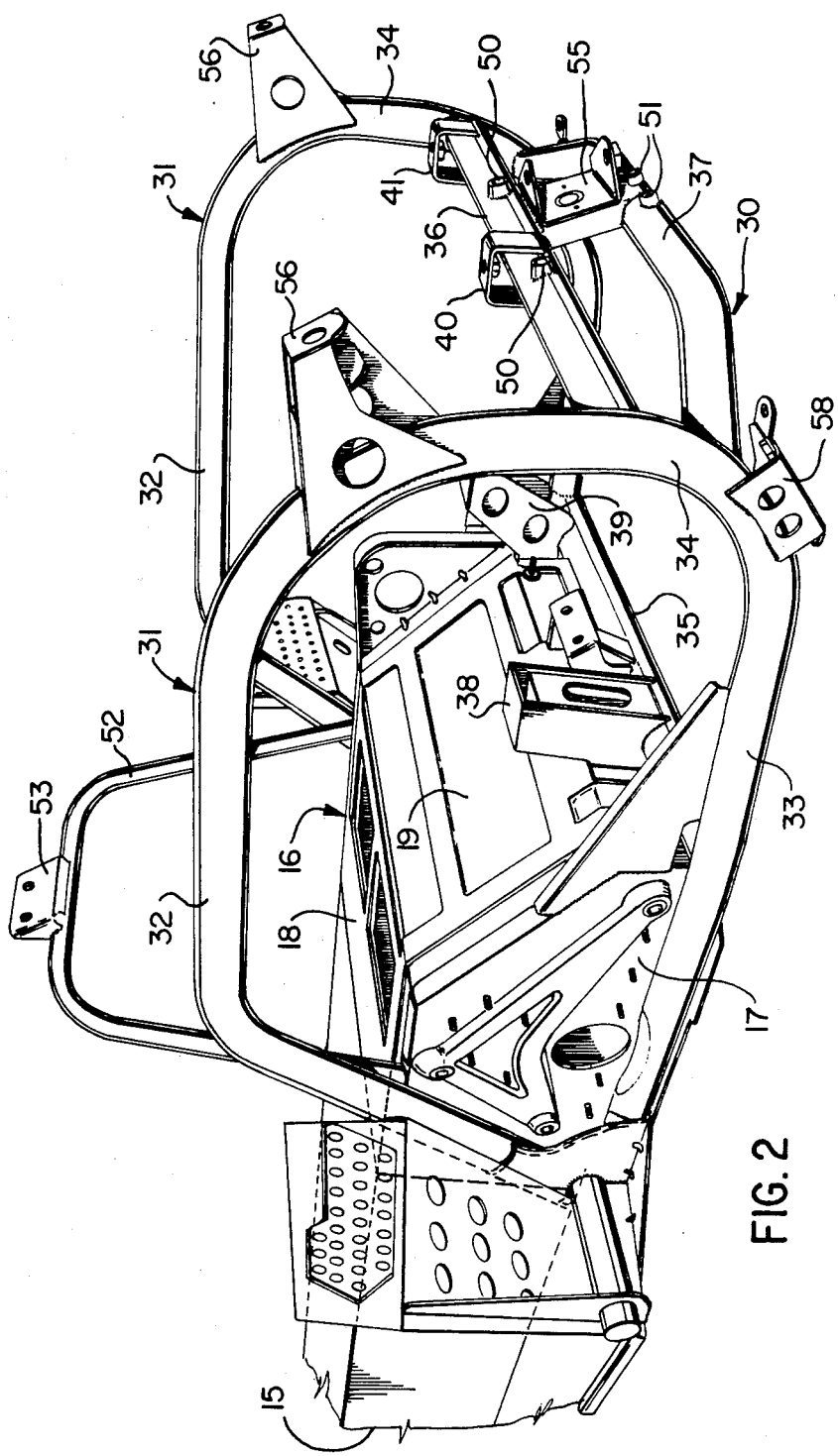
FIG. 2 is an enlarged perspective view of the frame structure of the snowmobile of FIG. 1.
Figure 3:
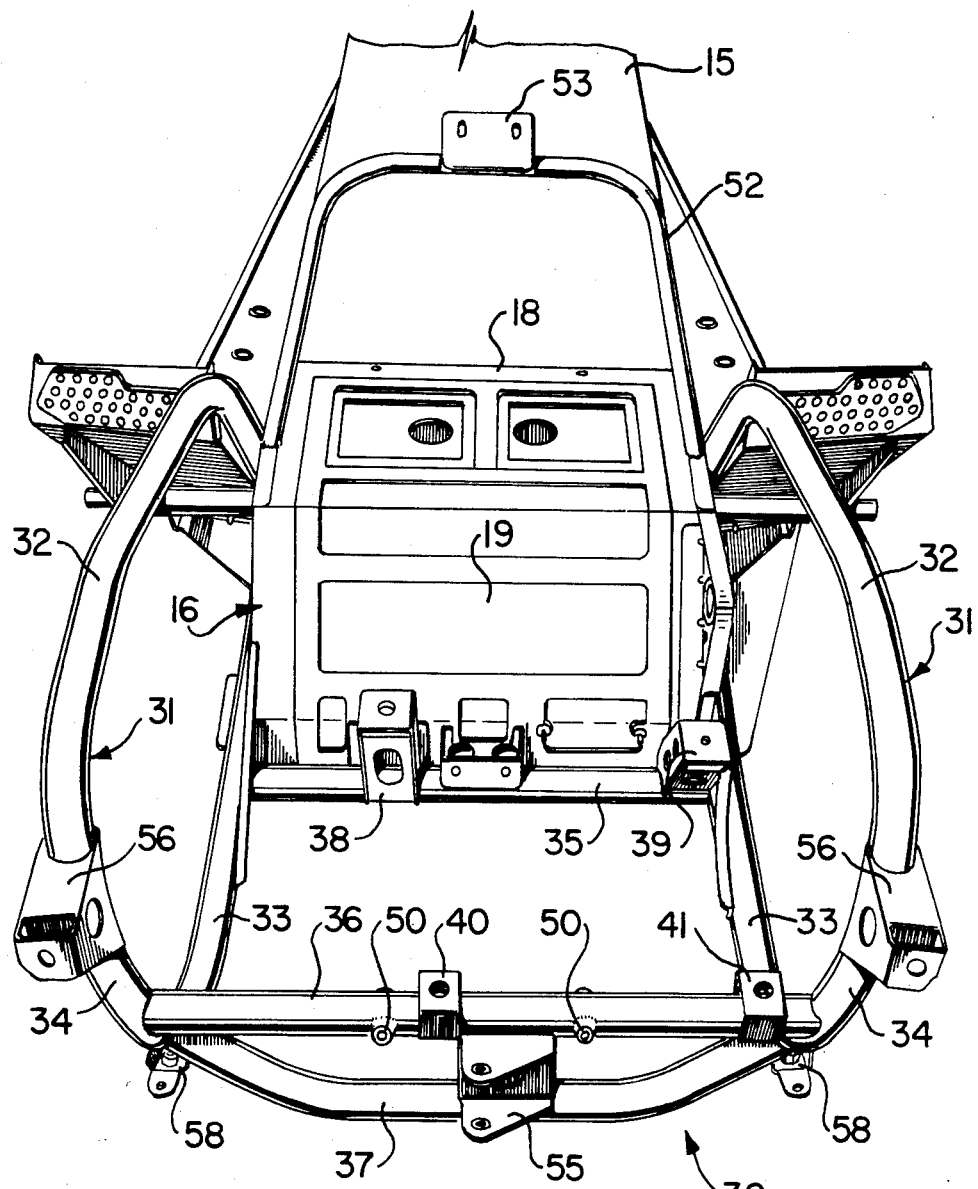
FIG. 3 is a front perspective view taken from above and showing the frame structure of FIG. 2.

As most clearly shown in FIGS. 2 and 3, the front portion of the track tunnel 15 is formed by a sheet steel pressing 16 suitably affixed, as by welding, to the remainder of the track tunnel. The pressing 16 has vertical side walls 17, is open on its underside (not shown) has a horizontal top wall 18, and an angled front wall 19, the lower portion of which is vertical.

The pressing 16 forms an attachment for a frame structure generally indicated at 30. The frame structure 30 comprises a pair of laterally spaced tubular steel side frame units 31 of loop-shaped configuration each of which is welded at its rear end to the associated side wall 17 of the pressing 16. Each side frame unit 31 has vertically spaced, substantially parallel upper and lower members 32,33 which merge into a convexly curved front member 34. The side frame units 31 are laterally interconnected by transversely arranged bracing means in the form of a first tubular member 35 interconnected and welded to the lower frame members 33, a second tubular member 36 spanning and interconnecting the front members 34 of the side frame units, and a third tubular member 37 spaced below the second tubular member 36 and interconnecting the side frame units in the region where the lower members 33 meet the front members 34. Thus, the side frame units 31 together with the transverse tubular members 35, 36 and 37 form a rigid open frame structure which, as will be described below, provides a mounting for the snowmobile engine and its ancilliary equipment, as well as for the skis, the ski suspension, and the steering mechanism.

The lower rear tubular member 35 has welded thereto a pair of brackets 38,39 for the attachment of rear mounts (not shown) for supporting the snowmobile engine. Similarly, the forward tubular member 36 has welded thereon a pair of engine mount supporting brackets 40 and 41.

The tubular member 36 has welded thereon a pair of threaded lugs 50, and the tubular arm 37 has formed thereon a similar pair of threaded lugs 51 to provide mountings for the arms of a parallelogram ski suspension linkage (not shown).

An inverted U-shaped tubular steel frame member 52 has lower ends welded to the pressing 16 and extends upwardly therefrom, supporting in its top portion a welded on bracket 53 to support a bearing mechanism (not shown) for the handle bars 54 of the steering mechanism. A further bracket 55 welded between the tubular members 36 and 37 forms a bearing arrangement for linkage members (not shown) of the steering mechanism.

Further brackets 56 welded to the front members 34 of the side frame units 31 provide mountings for the hydraulic damper units 57 of the ski suspension.

Further brackets 58 at the lower front portions of the side frame units 31 provide a means for attachment of the belly pan 59 to the snowmobile frame structure.

The snowmobile frame structure as above described has several advantages when compared with previously used arrangements. Thus, the large open loop shaped side frame units 31 provide ready access to the engine and other components which are mounted therebetween. The side frame units 31 are relatively light and yet very strong. They are readily adaptable to different engine and suspension configurations by using different arrangements of the transverse tubular members and of the various brackets which are provided to form supports for the engine suspension and steering components.

Since the belly pan is no longer a structural component of the snowmobile frame, the relatively heavy and expensive pressed metal belly pan as previously used can be dispensed with and replaced by a lightweight member, e.g. of glass fiber or plastic.

The improved frame structure is cheap, and yet provides very high resistance to bending and torsional stress, and provides an easy and flexible manner of attaching various accessories.

What is claimed is:

1. A snowmobile comprising: a front portion supported on a pair of spaced steerable skis and housing an engine coupled to drive an endless track which supports the rear portion of the snowmobile and is positioned within a longitudinally extending track tunnel of inverted U-shape, wherein two transversely spaced tubular side frame units form a rigid attachment to the front end of the track tunnel to be integral therewith and extend forwardly therefrom in a generally upright disposition, said side frame units being interconnected by transverse bracing means to form a frame structure that provides a mounting for the snowmobile engine, each said side frame unit comprising one continuous length of tube that is bent to form a closed loop.

2. A snowmobile according to claim 1 wherein said frame structure also provides a mounting for a suspension means for said skis and for a ski steering means.

3. A snowmobile according to claim 1 wherein said frame structure is a welded steel fabrication, said frame units having rear portions welded to the sides of the front of the track tunnel and said bracing means comprising at least one tubular element spanning the front ends of the side frame units and welded thereto.

4. A snowmobile frame structure according to claim 3 including brackets welded on said frame structure for the attachment of steering means and suspension means for said skis.

* * * * *